United States Patent

Grombka et al.

[15] 3,651,920
[45] Mar. 28, 1972

[54] PRESS FEED

[72] Inventors: Walter J. Grombka; Lloyd B. Lyon, both of Tiffin, Ohio

[73] Assignee: The National Machinery Company, Tiffin, Ohio

[22] Filed: Oct. 20, 1969

[21] Appl. No.: 867,736

[52] U.S. Cl. ............................................. 198/21, 198/24
[51] Int. Cl. ............................... B65g 47/00, B65g 47/42
[58] Field of Search ........................... 198/24, 21; 74/405

[56] References Cited

UNITED STATES PATENTS

| | | | |
|---|---|---|---|
| 3,366,219 | 1/1968 | Schickle | 198/24 |
| 2,740,541 | 4/1956 | Ashford | 198/24 |
| 3,068,987 | 12/1962 | Franklin | 198/85 |
| 3,407,916 | 10/1968 | Engeler | 198/24 |
| 1,904,434 | 4/1933 | Fish | 198/24 |

*Primary Examiner*—Richard E. Aegerter
*Attorney*—McNenny, Farrington, Pearne and Gordon

[57] ABSTRACT

A feeder for delivering blanks from a heating station to a loading station of a transfer for a forging machine at a rate which corresponds to a desired feed rate for the machine. The feeder includes a loop conveyor to deliver heated blanks to a conveyor discharge station on the conveyor. A second conveyor extends from the conveyor discharge station to the loading station of the transfer. A push rod is provided at the conveyor discharge station to move the blank to a lifter mechanism which lifts the blank to a position on the second conveyor. A pusher is movable along the second conveyor from a fully retracted position to push the lifted blank along the second conveyor to the transfer loading station.

9 Claims, 6 Drawing Figures

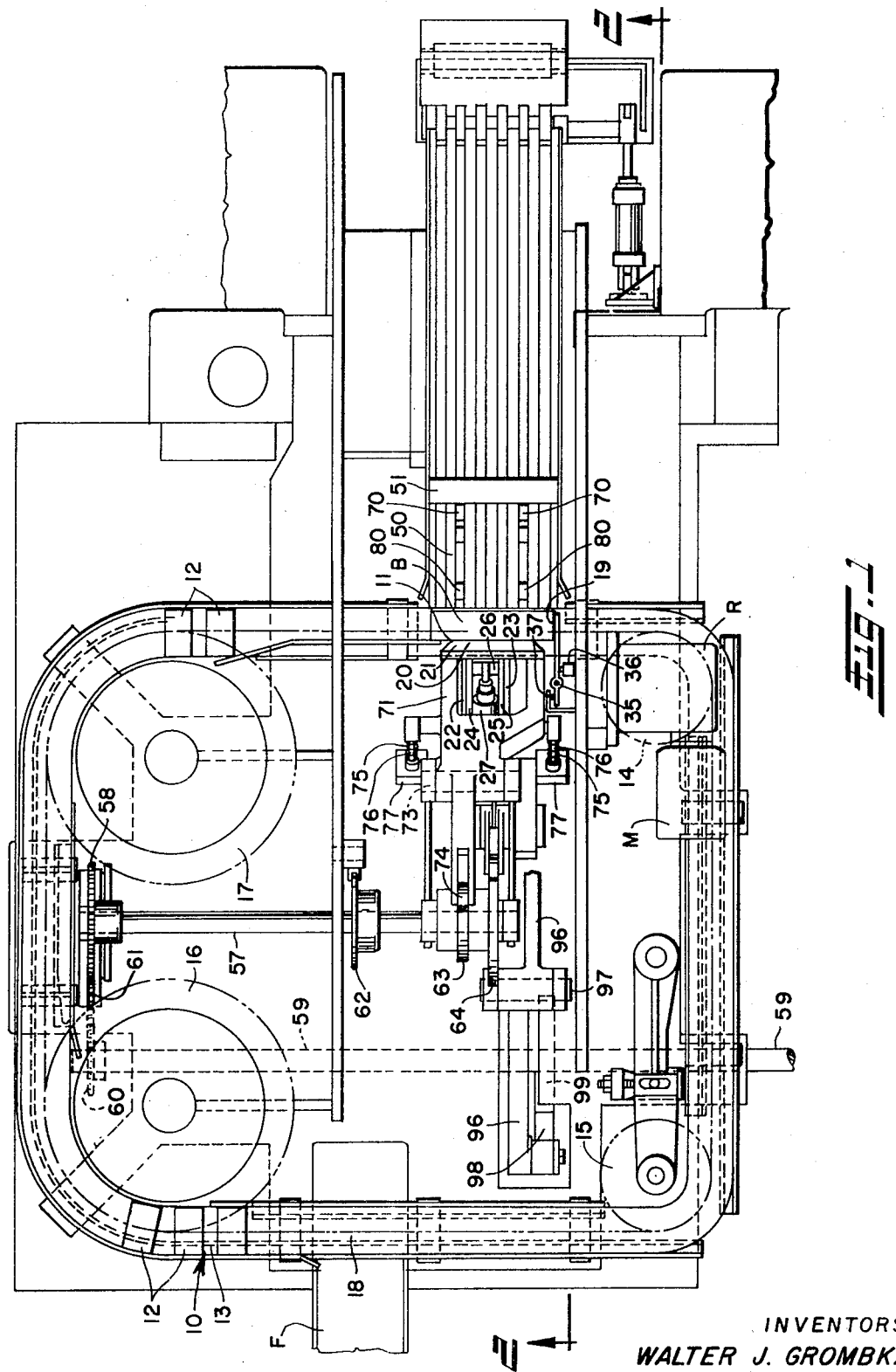

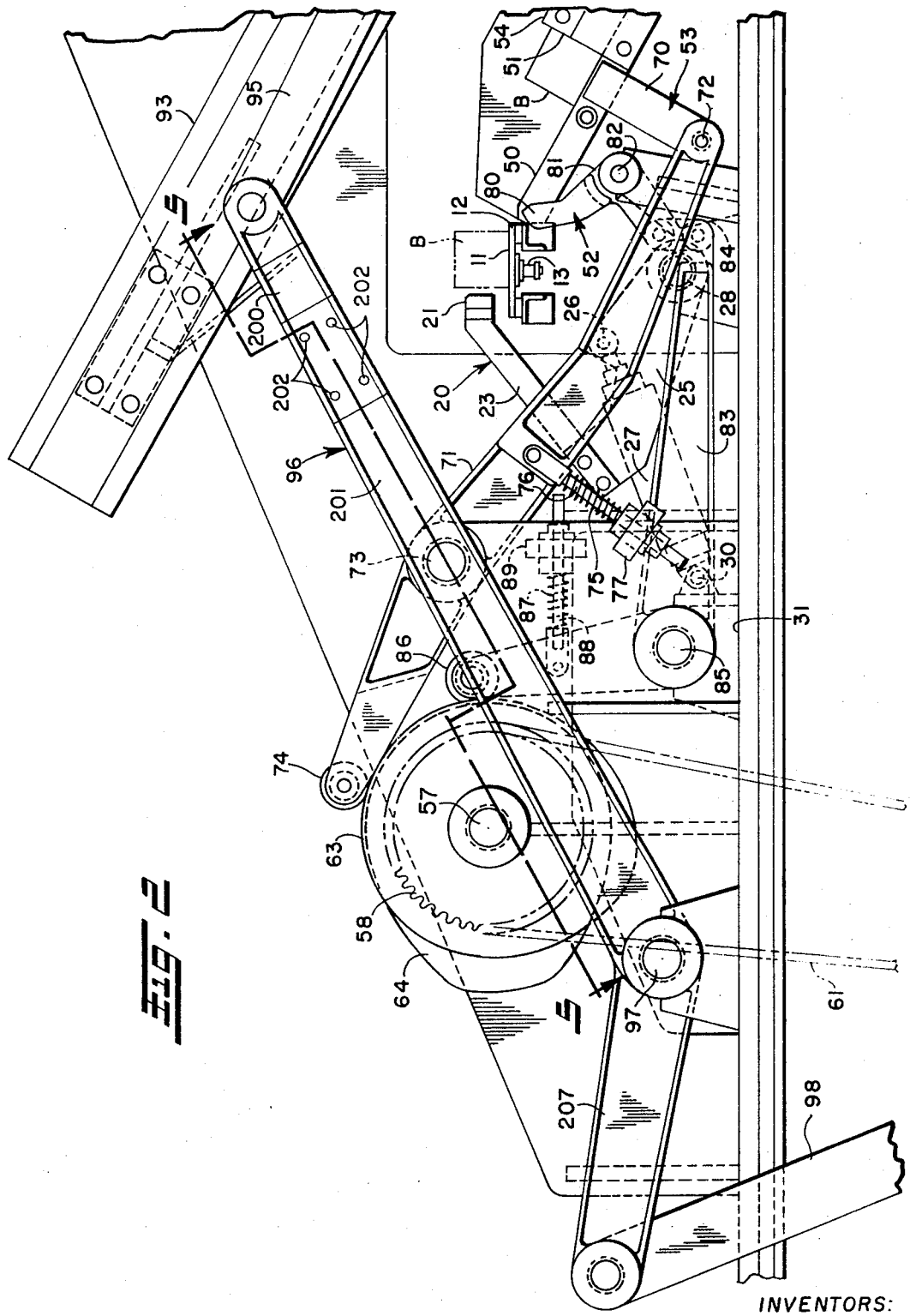

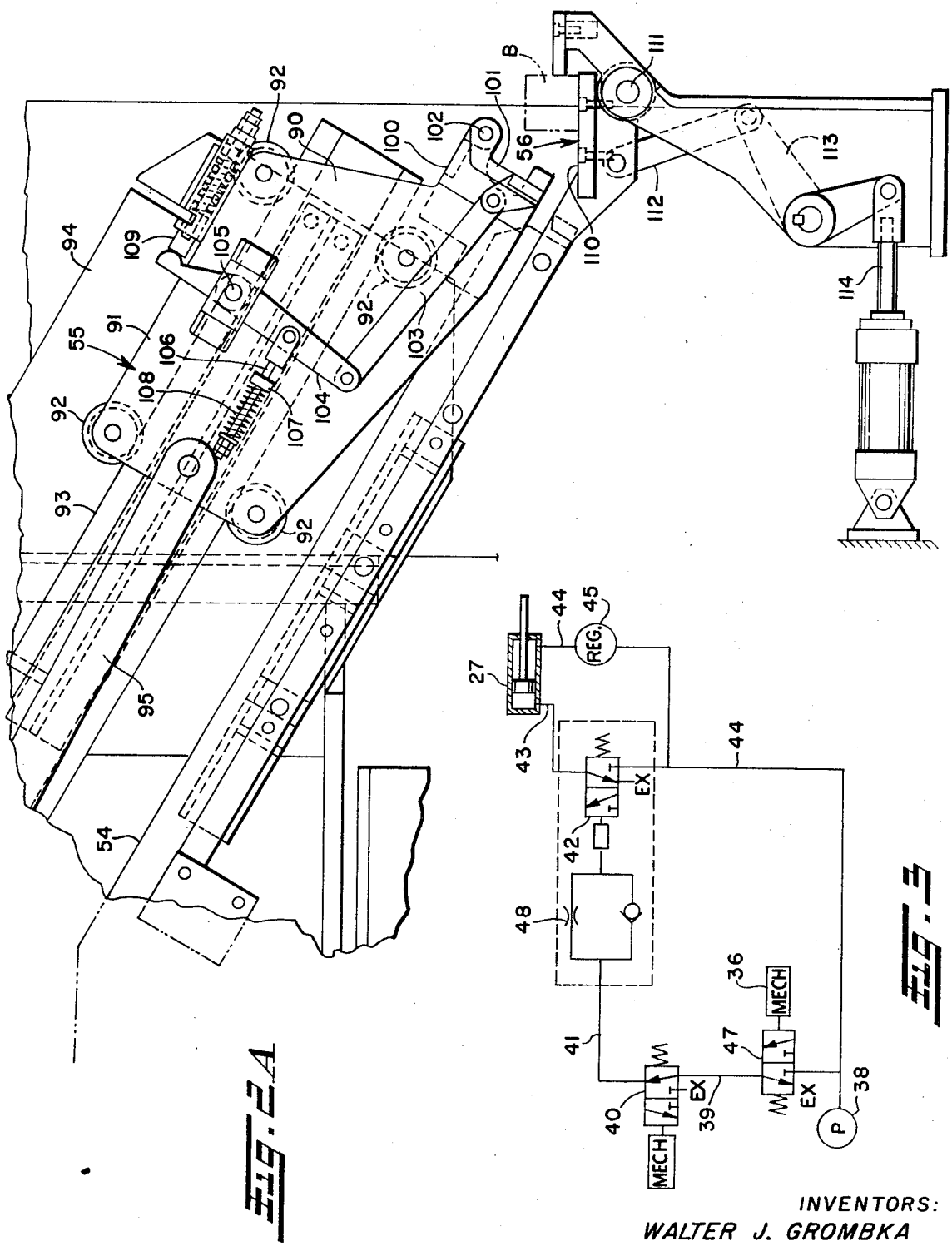

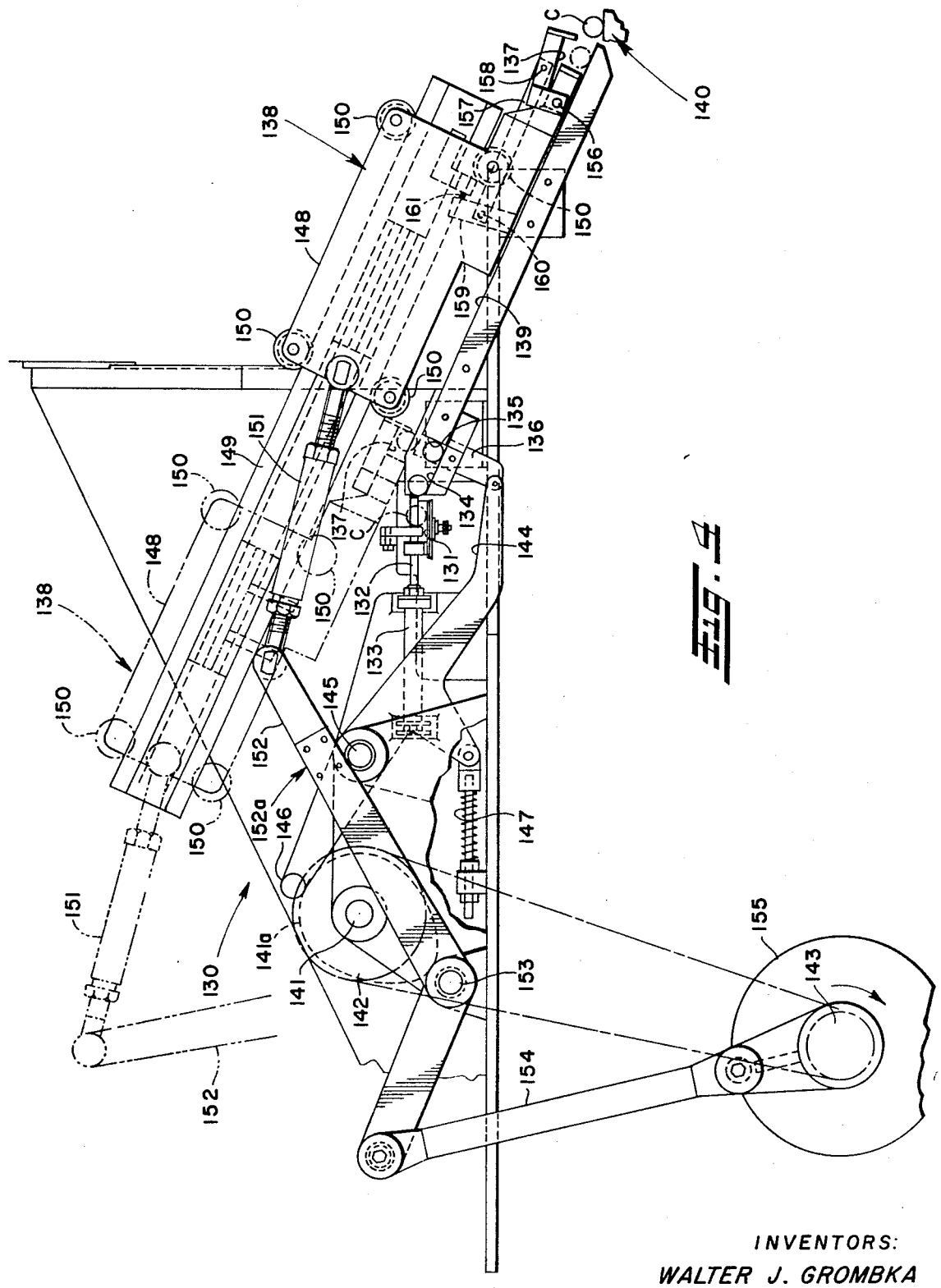

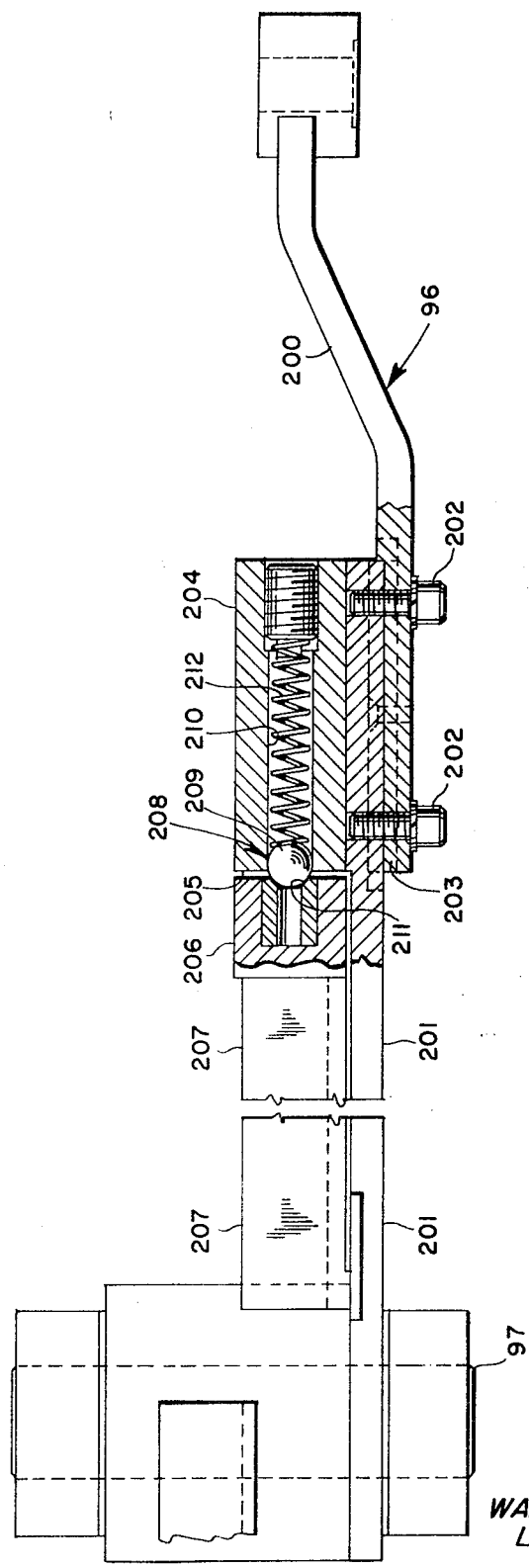

3,651,920

PRESS FEED

BACKGROUND OF THE INVENTION

This invention relates to a machine for delivering blanks to a forging press at a predetermined rate. More specifically, this invention relates to a conveyor device suitable for delivering heated blanks from a furnace to the press transfer section of a forging machine.

An example of such a press transfer mechanism is shown in U.S. Pat. No.3,422,657 and includes a pair of substantially parallel beams which extend across the horizontal die-breast of and a forging machine past the die stations. These beams are supported on their ends for rectilinear movement in three directions, each of which is perpendicular to the other two directions. Gripping means are mounted on the beams and are arranged to progressively grip and move blanks to each die station. According to the teachings of U.S. Pat. No. 3,422,657, blanks are fed to an end loading position on the transfer and are successively carried to various die stations on the forging machine by the transfer beams.

SUMMARY OF THE INVENTION

The present invention is directed to a novel conveying device for delivering blanks to the transfer portion of a forging machine at a predetermined rate. The conveying device according to the invention permits the operator of the forging machine to direct his attention to the forging operation rather than to the feeding operation, since the conveying device according to this invention need not be fed at a rate which precisely corresponds to the desired feed rate for the machine.

The invention provides a loop conveyor extending between a heating furnace for the blanks and a conveyor discharge station. A second conveyor extends from the conveyor discharge station to the loading end of the forging machine transfer. Means are provided to index the blanks between the conveyor discharge station and the transfer end feed station at a rate which corresponds to a desired feed rate for the forging machine. Thus, the demand rate of the forging machine needs only be approximated in transferring blanks from the furnace to the conveyor in accordance with this invention.

OBJECTS OF THE INVENTION

It is an important object of this invention to provide a conveyor device for feeding blanks to a transfer section of a forging machine at a rate which corresponds to a predetermined feed rate for the forging machine.

It is a further object of this invention to provide a machine for conveying rectangular forging stock from a heating furnace to the transfer section of the forging machine.

It is a still further object of this invention to provide a machine for conveying round forging stock from a heating furnace to the transfer section of a forging machine.

Further objects and advantages will appear from the following description and drawings, wherein;

FIG. 1 is a plan view of a conveying device according to one aspect of this invention, with certain portions of the device omitted for clarity;

FIG. 2 is a partial cross-sectional view, the plane of the section being indicated by the line 2—2 in FIG. 1;

FIG. 2A is the remaining portion of the partial cross-sectional view illustrated in FIG. 2;

FIG. 3 is a schematic control circuit for the device illustrated in FIGS. 1 and 2;

FIG. 4 is an elevational view, similar to FIGS. 2 and 2A but showing a mechanism for conveying round blanks according to a further aspect of this invention; and FIG. 5 is a cross-sectional view with certain portions broken away, the plane of the view being indicated by the line 5—5 in Fig. 2.

FIGS. 1–3 illustrate a conveying device for feeding square or rectangular blanks to the transfer of a forging machine, such as the transfer set forth in U.S. Pat. No. 3,422,657. The conveying device shown in FIGS. 1—3 includes a loop conveyor 10 which delivers blanks B from the output end of a furnace conveyor F to a conveyor discharge station 11 on the conveyor. The conveyor 10 includes a bed formed by a plurality of conveying sections 12. The conveying sections 12 are driven by a chain 13 which extends in a loop about a driving sprocket 14 and idler sprockets 15, 16, and 17. The sprocket 14 is driven by a motor M through a reduction gear box R so that the conveyor 10 is driven in a clockwise direction, as viewed in FIG. 1. The conveyor 10 may be loaded with blanks B at a loading station 18. It should be appreciated, however, that the conveyor 10 may be loaded at any convenient location about its extent.

Each blank B delivered to the conveyor discharge station 11 is stopped by a plate 19 which extends across the conveyor 10. The plate 19 stops each blank at the conveyor discharge station 11 and conditions the pneumatic circuit illustrated in FIG. 3 for operation of a conveyor discharge lever 20 which pushes the blank from the conveyor. The conveyor discharge lever 20 has an elongated pushing face 21 which is mounted across the ends of a pair of parallel links 22 and 23. The links 22 and 23 are, in turn, fixed to crank arms 24 and 25, respectively. The crank arms 24 and 25 are tied together by a tie rod 26 which in turn is a pivotally connected to the rod end of a pneumatic cylinder 27. The crank arms 24 and 25 are pivoted about a cross rod 28 and the cylinder 27 is pivoted at its other end to a pin 30 which is fixed to a supporting platform 31.

Since the plate 19 stops the blanks, a reservoir of blanks may be permitted to accumulate on the conveyor to insure an adequate supply of blanks delivered to the conveyor discharge station.

As was previously indicated, the plate 19 not only stops a blank B at the conveyor discharge station 11 but also conditions the hydraulic circuit shown in Fig. 3 to operate the conveyor discharge cylinder 27. The plate 19 is pivotally connected to a pin 35 and is biased away from a valve operating switch 36 by a spring 37. When a blank B is at the conveyor discharge station 11 and butts against the plate 19, the switch 36 is tripped to operate a valve 47 (FIG. 3) to connect a source of fluid pressure 38 to a line 39. If a conveyor discharge prevent valve 40 is in the position illustrated in Fig. 3, the conveyor discharge cylinder 27 will be operated to push the blank B from the conveyor discharge station 11. Thus, with the valve 40 in its illustrated position, the line 39 is connected to a line 41 and a time delayed valve 42 is operated to connect a piston supply line 43 to the source of fluid pressure via a line 44. The valve 42 insures a full stroke of the conveyor discharge cylinder 27 even if the valves 47 and/or 40 are returned to a position exhausting the line 41 through the valve 40 or exhausting the line 39 through the valve 47, since the valve 42 is spring returned to its illustrated position against fluid pressure throttled through a throttling valve 48 so that reversal of the valve 42 is delayed for a predetermined time interval. After the valve 42 is returned to its illustrated position, the line 43 will be exhausted through the timer valve and the cylinder 27 will be retracted by accumulated pressure in the rod end of the cylinder and in a surge line 44 which is maintained at a pressure lower than line pressure when the cylinder is in its retracted position by a regulating valve 45.

After the blank B is discharged from the conveyor discharge station 11 by the lever 20, the blank B is indexed along an inclined surface 50 and against an abutment 51 by an indexing finger 52. After the blank B is moved against the abutment 51 by the indexing finger 52, the blank is raised by a lift arm 53 until its bottom surface is aligned with the surface of a downwardly extending conveyor chute 54 (FIG. 2A). With the blank B in such a raised position, a pusher 55 is driven from a retracted position to engage the raised blank and then push the blank along the conveyor 54 to a loading station 56 of a transfer for a forging machine.

Operation of the conveyor discharge cylinder 27, the finger 52, the lifter 53, and the pusher 55 is all timed so that they operate in a predetermined sequence with respect to each other when a blank is properly located at the conveyor discharge station to deliver blanks at predetermined intervals to the transfer as a function of a predetermined delivery rate to the transfer. Therefore, these functions are controlled by a camshaft 57 which is driven by a sprocket 58. The sprocket 58 is in turn driven by a chain 61, which is in turn driven by a sprocket 60 fixed to a shaft 59. The shaft 59 is preferably an extension of the cross shaft 34 shown and described in U.S. Pat. No. 3,422,657.

Since each rotation of the cross shaft 34 shown in U.S. Pat. No. 3,422,657 causes a lifting cycle of the transfer, the conveying cycle according to this invention may be related to the transfer cycle. Thus, the conveying device according to this invention may be a ratio of 1:1, 1:2, 1:3, etc. of the forging machine rate by changing the ratio between the drive sprocket 58 and a sprocket 60 on the shaft 59. In the embodiment illustrated in FIGS. 1 and 2, the ratio between the sprockets 60 and 58 is such that the shaft 57 is driven at one-half the revolutions of the shaft 59 and, therefore, blanks will be fed to the transfer at alternate operational cycles of the transfer shown in U.S. Pat. No. 3,422,657.

The shaft 57 carries a cam 62 which controls the operation of the conveyor discharge prevent valve 40, a cam 63 which controls the operation of the lifter 53, and carries a cam 64 which controls operation of the indexing finger 52. The lifter 53 is formed by a plurality of lifting elements 70 which extend through slots in the surface 50 to engage a blank B, which has been indexed in place against the abutment 51. The elements 70 are pivotally connected to the ends of a bifurcated lifting lever 71 by pivot pins 72. The lifting lever 71 is in turn pivotally connected to a pin 73 and has a cam follower 74 at one end of an arm portion. The cam follower 74 is spring-biased against the cam 63 by compression springs 75 which surround guide rods 76. The guide rods are pivoted at one end to the lever 71 and have their other ends slidably received in bushings 77.

The indexer 52 comprises a plurality of fingers 80 which extend through slots in the surface 50 and each of the fingers 80 comprises one end of a crank arm 81. Each crank arm 81 is pivotally connected to a pin 82 and is rocked about the pin 82 by a crank arm 83. The crank arm 83 is connected to each crank arm 81 by links 84 which are pivoted to the crank arms 81 and 83. The crank arm 83 is pivotally connected to a pin 85 and has a cam follower 86 which is spring-biased against the cam 64 by a compression spring 87. The compression spring 87 surrounds the guide rod 88 which extends between one arm of the crank 83 and a fixed member 89.

The pusher 55 also operates at a reciprocation rate determined by the shaft 59. The pusher 55 includes a head 90 (FIGS. 2A), which comprises a plate 91 having a plurality of rollers 92 mounted thereon. The rollers 92 guide the head 90 along a guide beam 93 which is fixed to a frame member 94. The plate 91 has a drive rod 95 pivoted thereto. The other end of the drive rod 95 is pivotally connected to a crank arm 96 which is in turn pivotally connected to a pin 97 mounted on the supporting platform 31. The crank arm 96 is pivoted to a driving link 98 and the link 98 is pivoted to the periphery of a drive wheel 99 on the shaft 59. Thus, each rotation of the shaft 59 reciprocates the head 55 from a fully retracted position, across the location of a blank raised by the lifter 53 to drive the blank along the surface of the downwardly extending conveyor chute 54.

As may be seen most clearly in FIG. 5, the crank arm 96 is provided with a relieving mechanism to prevent damage to the crank arm 96 and/or other associated mechanisms if jamming occurs. The crank arm 96 includes a first link 200 which is pivotally connected to the drive rod 95. A second link 201 is fixed to the link 200 by bolts 202, and, to eliminate undue sheer stresses on the bolts 202, a key 203 is provided between the links 200 and 201. A block 204 is welded to the link 201 and has an end face 205 which is spaced from an end portion 206 of a crank arm link 207.

The links 207 and 201 are separately journaled on the pin 97 and are normally connected together by a detent mechanism 208. The detent mechanism 208 includes a ball 209 positioned in a bore 210 in the block 204. The ball 209 is biased within a socket 211 provided in the end portion 206 by a relatively strong spring 212. Thus, the crank arm link 207 is driven by the driving link 98 and the crank arm link 207 drives the link 200 which is normally connected thereto by the spring detent mechanism 208. If jamming should occur, however, the crank arm link 207 will be disassociated from the link 200 if the jamming force exceeds the bias of the spring 212. This feature ensures that the crank arm 96 will not be permanently damaged by jamming.

A projecting portion 100 of the pusher 55 engages the blank B during the pushing operation. The projecting portion 100 includes a lever 101 which is pivoted to a pin 102. A link 103 is pivoted at one end to the lever 101 and is pivoted at its other end to a cross arm 104. The cross arm 104 is pivotally connected to the plate 91 by a pin 105 and has a guide rod 106 which extends through a projection 107 on the plate 91. A spring 108 biases the cross arm 104 rearwardly so that the lever 101 is retained in its illustrated position. When the pusher 55 reaches the end of its stroke, the cross arm 104 butts against an adjustable pin 109 on the frame 94 to swing the lever 101 about its pivot pin 102 against the bias of the spring 108. This movement properly locates the blank B to the loading station 56 of the transfer.

The loading station 56 includes a platform 110 which serves as a reject trip platform to discharge a defective or improperly heated blank from the load station. The platform 110 is pivoted about a pin 111 and has a link 112 pivotally connected thereto. The link 112 is, in turn, pivotally connected to a crank arm 113 which is driven by a piston 114. Retraction of the piston causes the crank arm 113 to rotate in a counterclockwise direction to drop the platform 110 and discharge the blank B prior to transfer operations.

Proper sequential operation of the conveying device shown in FIGS. 1 through 3 is dependent upon the relative angular positions of the cams 62, 63, and 64 on the camshaft 57. Thus, assuming the illustrated 1:2 ratio between the rotation of the shaft 59 and the rotation of the camshaft 57, the conveyor discharge prevent valve 40, the finger 52, and the lifter 53 are operated in a timed relationship with alternate strokes of the pusher 55. As the pusher 55 approaches the end of one of its forward alternate strokes, the cam 62 shifts the valve 40 from its illustrated position to a position which vents the line 41. The cam 61 maintains the valve 40 in this position until the pusher 55 clears the conveyor discharge station 11 during its return stroke. During this interval, the conveyor discharge cylinder 27 is inoperative, but, during all other intervals, a blank B butting against the plate 19 will permit operation of the conveyor discharge cylinder 27 and will be discharged onto the surface 50. During retraction of the pusher 55, and while the conveyor discharge prevent valve 40 vents the line 41, the cam 63 operates the finger 52 to index a blank B against the abutment 51. Just prior to the complete retraction of the pusher 55, the finger 52 is returned to its illustrated position at the same time that the conveyor discharge prevent valve 40 is returned to its illustrated position. Just prior to complete retraction of the pusher 55, and just after the finger 52 and the prevent valve 40 are returned to their illustrated positions, the cam 64 operates the lifter 53 to move the blank B upwardly as the pusher 55 begins its forward stroke. All of these operations may be synchronized with the operation of the transfer according to U.S. Pat. No. 3,422,657 if the shaft 59 comprises the cross shaft 34 shown in that patent.

According to a further aspect of this invention, a conveying device is provided for feeding round blanks to the transfer of a forging machine, such as the transfer set forth in U.S. Pat. No. 3,422,657. As is shown in Fig. 4, such a conveying device 130 may be provided in a loop conveyor similar to the loop conveyor 10 illustrated in Fig. 1 and 2. The loop conveyor delivers cylindrical blanks C to a conveyor similar discharge station 131 and each blank C delivered to the conveyor discharge station 131 is stopped by a plate (not shown) similar to the plate 19 shown in Fig. 1. The plate stops each blank C at the conveyor discharge station 131 and each blank so stopped is immediately discharged by a conveyor discharge push rod 132 which operates in response to the plate to push each blank C from the conveyor. The push rod 132 is actuated by a pneumatic cylinder 133 which is similar in operation to the pneumatic cylinder 27 shown in Fig. 1 through 3.

After a blank C is discharged from the conveyor discharge station 131 by the push rod 132, the blank C rolls down an inclined surface 134 and against an abutment 135. After the blank C rolls against the abutment 135, the blank is raised by a lift arm 136 until it is positioned within a gated pocket 137 provided at the end of a pusher 138. The pusher 138 is then advanced to its solid outline position in Fig. 4 to move the blank C along an inclined conveying surface 139 to a transfer load station 140.

Operation of the lifter 136 and the pusher 138 is timed so that these elements operate in a predetermined sequence with respect to each other to deliver blanks at predetermined intervals to the transfer as a function of a predetermined delivery rate to the transfer. The operation of the lifter 136 is controlled by a camshaft 141 which is driven by a sprocket 142. The sprocket 142 is in turn driven by a chain from a sprocket on a shaft 143. The shaft 143 is preferably an extension of the cross shaft 34 shown and described in U.S. Pat. 3,422,657.

The camshaft 141 has a cam 141a which controls the operation of the lifter 136. The lifter 136 is pivotally connected to a crank arm 144, which in turn is pivoted about a pin 145. The crank arm 144 has a cam follower 146 which is biased against the cam 143 by a spring 147. Each rotation of the camshaft 141 causes the lifter 136 to raise a blank C into the gated pocket 137.

The pusher 138 includes a plate 148 which is guided along a guide track 149 by rollers 150. An adjustable length link 151 is pivotally connected to one end of the plate 148 and is pivotally connected at its other end to a crank arm 152. The crank arm 152 is pivotally connected to a pin 153. The crank arm 152 is driven by a drive rod 154 and the drive rod 154 is in turn pivotally connected to a drive wheel 155 on the shaft 143. For each rotation of the shaft 143, the pusher 138 is driven through one cycle of its operation between the fully retracted position illustrated in dotted outline and its fully advanced position illustrated in solid outline.

The crank arm 152 includes a relieving mechanism 152a. The mechanism 152a is not shown in detail, but is generally similar to the relieving mechanism shown in FIG. 5.

The ratio between the sprocket on the drive shaft 143 and the sprocket 142 determines the relationship between the operation of the lifter 136 and the operation of the pusher 138. Thus, the pusher 138 may operate one or more times for each operation of the lifter 136, depending upon the ratio between the sprocket on the shaft 143 and the sprocket 142. In the illustrated embodiment, the lifter 136 operates during alternate strokes of the pusher 138.

The cam 141a is positioned on the camshaft 41 so that the lifter 136 is substantially in its fully raised position when the pusher 138 is in its fully retracted position, with the drive rod 154 at bottom dead center. The blank C is thereby raised into the gated pocket 137 and is driven by the pusher along the conveyor 139 prior to retraction of the lifter 136.

When the pusher 138 reaches the end of its stroke, the gated pocket 137 opens to permit the blank C to roll onto the surface 140. The gated pocket 137 is pivotally connected to the plate 148 by a pin 156 and has a link 157 pivotally connected thereto by a pin 158. The link 157 is pivotally connected at its other end to a link 159 which in turn is pivoted to the plate 148 by a pin 160. When the pusher 138 reaches the end of its stroke, the link 159 engages a fixed stop 161 on the guide track 149 to swing the link 159 about its pin 160 and to thereby raise the gated pocket 137.

Although a preferred embodiment of this invention is illustrated, it is to be understood that various modifications and rearrangements of parts may be resorted to without departing from the scope of the invention.

What is claimed is:

1. A feeder for delivering blanks from a heating station to a loading station of a transfer for a forging machine at a rate which corresponds to a desired feed rate for the machine, said feeder including conveyor means to deliver heated blanks to a conveyor discharge station on the conveyor, means defining a path from said conveyor discharge station to a loading station of a transfer, blank moving means for moving a blank delivered to said conveyor discharge station from said discharge station to a first position on said path defining means, lifter means to lift said blank from said first position to a second position on said path defining means, pusher means having a blank engaging portion, said pusher means being reciprocable from a retracted position wherein said blank engaging portion engages a blank at said second position on said path and then moves the blank along said path to an extended position to carry said blank to said loading station at a reciprocation rate corresponding to the desired feed rate, means to operate said blank moving means when the pusher is in its retracted position, and rotatably mounted shaft means adapted to be driven at a predetermined rotational speed, means responsive to rotation of said shaft means to establish the reciprocation rate of said pusher, said means to operate said blank moving means being responsive to rotation of said shaft to establish the sequence of operation of said blank moving means.

2. A feeder according to claim 1, including stop means at said conveyor discharge station to permit blanks to accumulate on said conveyor to insure an adequate supply of blanks delivered to said station.

3. A feeder according to claim 1 wherein said conveyor means to provided with means to sense the presence or absence of a blank at said conveyor discharge station, said blank moving means being operable in response to said sensing means only when (a) the sensing means senses the presence of a blank, (b) the pusher is in its retracted position, and (c) the lifter means is in its lowered position.

4. A feeder according to claim 2 wherein said sensing means includes a movable plate extending across said conveyor discharge station which is moved by a blank conveyed to said station and wherein said means to operate said blank moving means comprises cylinder means, line means connecting said cylinder means to a source of fluid pressure, said cylinder means being operable when connected to said source and being retracted to a non-operable position when said line is exhausted, first and second valve means in said line means, each of said valve means being in a normal position exhausting said line and being operable to connect said cylinder means alternately to said fluid pressure source and to exhaust, said first valve means being operated in response to movement of said plate to partially connect said line to said fluid pressure source, and said second valve means completing said connection when the pusher is in its retracted position and the lifter means is in its lowered position.

5. A feeder according to claim 1 wherein said conveyor means comprises an endless loop conveyor.

6. A feeder for delivering blanks from a heating station to a loading station of a transfer for a forging machine at a rate which corresponds to a desired feed rate for the machine, said feeder including a loop conveyor to deliver heated blanks to a conveyor discharge station on said conveyor, means defining a downwardly extending path from said conveyor discharge station to the loading station of a transfer, said path having first and second portions, said first path portion being lower than the second path portion and being separated from said second path portion by an abutment, blank moving means to move a blank delivered to said conveyor discharge station from said discharge station onto said first path portion, lifter means to move a blank from said first path portion to the level of said second path portion, a pusher having a blank-engaging portion, said pusher being reciprocable along a guide track from a retracted position above said first path portion, along said second path portion, and then to an extended position to carry said blank at said second path portion to said loading station, crank arm means pivotally connected to said pusher, drive shaft means for driving said crank arm to reciprocate said pusher, camshaft means driven by said drive shaft means, means operable in response to rotation of said camshaft means to permit operation of said blank moving means only when said pusher is in its retracted position.

7. A feeder according to claim 6, including means to operate said lifter means, said lifter operating means being operated in response to rotation of said camshaft only when said pusher is in its retracted position.

8. A feeder according to claim 7, wherein said loop conveyor is provided with means to sense the presence or absence of a blank at said conveyor discharge station, said blank moving means being operable in response to said sensing means only when (a) the sensing means senses the presence of a blank, (b) the pusher is in its retracted position, and (c) the lifter means is in its lowered position.

9. A feeder according to claim 8 wherein said sensing means includes a movable plate extending across said conveyor discharge station which is moved by a blank conveyed to said station, and wherein said blank moving means is operated by cylinder means, line means connecting said cylinder means to a source of fluid pressure, said cylinder means being operable when connected to said source and being retracted to a nonoperable position when said line is exhausted, first and second valve means in said line means, each of said valve means being in a normal position exhausting said line and being operable to connect said cylinder means alternately to said fluid pressure source and to exhaust, said first valve means being operated in response to movement of said plate to partially connect said line to said fluid pressure source and said second valve means operating in response to rotation of said camshaft to complete said connection when the pusher is in its retracted position and the lifter is in its lowered position.

* * * * *